(12) United States Patent
Sood et al.

(10) Patent No.: US 8,555,163 B2
(45) Date of Patent: Oct. 8, 2013

(54) SMOOTH STREAMING CLIENT COMPONENT

(75) Inventors: Vishal Sood, Bothell, WA (US); Geqiang (Sam) Zhang, Redmond, WA (US); Lin Liu, Sammamish, WA (US); Krishna Prakash Duggaraju, Renton, WA (US); Sam J. George, Kenmore, WA (US); Jack E. Freelander, Monroe, WA (US); Anirban Roy, Kirkland, WA (US); John A. Bocharov, Seattle, WA (US); Jeffrey M. Wilcox, Seattle, WA (US); Raymond Cheng, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 576 days.

(21) Appl. No.: 12/796,670

(22) Filed: Jun. 9, 2010

(65) Prior Publication Data
US 2011/0307623 A1 Dec. 15, 2011

(51) Int. Cl.
G06F 3/01 (2006.01)
G06F 15/16 (2006.01)

(52) U.S. Cl.
USPC .......................................... 715/704; 715/716

(58) Field of Classification Search
USPC .................................................. 715/704, 716
See application file for complete search history.

(56) References Cited

U.S. PATENT DOCUMENTS

| | | | |
|---|---|---|---|
| 2002/0056107 A1 | 5/2002 | Schlack | |
| 2006/0287912 A1 | 12/2006 | Raghuvamshi | |
| 2007/0204310 A1 | 8/2007 | Hua et al. | |
| 2008/0147214 A1* | 6/2008 | Lee et al. | 700/94 |
| 2008/0250319 A1* | 10/2008 | Lee et al. | 715/716 |
| 2009/0222442 A1* | 9/2009 | Houh et al. | 707/5 |
| 2009/0228897 A1* | 9/2009 | Murray et al. | 719/313 |
| 2009/0328124 A1* | 12/2009 | Khouzam et al. | 725/116 |
| 2011/0246879 A1* | 10/2011 | White et al. | 715/704 |

OTHER PUBLICATIONS

Sood, Vishal., "Composite Manifest Support for Rough Cut Editing scenarios in SSME", Retrieved at << http://blogs.iis.net/vsood/archive/2010/01/22/composite-manifest-support-for-rough-cut-editing-scenarios-in-ssme.aspx >>, Jan. 22, 2010, pp. 3.

Likness, Jeremy., "Programmatically Accessing the Live Smooth Streaming API", Retrieved at << http://csharperimage.jeremylikness.com/2010/01/programmatically-accessing-live-smooth.html >>, Jan. 29, 2010, pp. 13.

"Timeline Markers and Events (IIS Smooth Streaming)", Retrieved at << http://msdn.microsoft.com/en-us/library/ee958034.aspx >>, Retrieved Date: Feb. 8, 2010, pp. 8.

(Continued)

Primary Examiner — Krisna Lim
(74) Attorney, Agent, or Firm — Rau Patents, LLC (57) ABSTRACT

A streaming abstraction system is described herein that provides application developers a client software development kit (SDK) on top of which to build smooth streaming solutions. The system reduces development time considerably and abstracts platform specific intricacies and protocol handling on the client. In addition, the streaming abstraction system makes it possible to monetize streaming content with advanced features like advertising and analytics and provides advanced capabilities like multiple camera angles, diagnostics, and error handling. In some embodiments, the streaming abstraction system provides an intermediate layer that operates between an application and an underlying client media platform. The intermediate layer manages smooth streaming protocol handling as well as interactions with the platform-specific runtime.

11 Claims, 4 Drawing Sheets

(56) References Cited

OTHER PUBLICATIONS

Knowlton, Chris., "Live Broadcasting with Silverlight and Windows Media", Retrieved at << http://www.streamingmedia.com/west/presentations/SMWest09-MSFT-Workshop.pdf >>, Retrieved Date: Feb. 8, 2010, pp. 110.

"IIS Smooth Streaming Player Development Kit—Beta 2", Retrieved at << http://www.microsoft.com/downloads/details.aspx? FamilyID=2b1ce605-3b99-49ad-8a26-1250f2acbbf6&displayLang=en >>, Version 1.0, Jan. 14, 2010, pp. 2.

* cited by examiner

FIG. 4

SMOOTH STREAMING CLIENT COMPONENT

BACKGROUND

Streaming media is multimedia that is constantly received by, and normally presented to, an end-user (using a client) while it is being delivered by a streaming provider (using a server). Several protocols exist for streaming media, including the MICROSOFT™ Internet Information Server (IIS) Smooth Streaming protocol (referred to herein as smooth streaming). Prior to smooth streaming, most streaming media technologies used tight coupling between server and client with a stateful connection. The stateful connection between client and server created additional server overhead (because the server tracked a current state of each client), and limited the scalability of the server.

Smooth streaming provides stateless communication between the client and server by breaking media up into chunks that are individually addressable and can be individually requested by clients. For a particular media event or content item, the smooth streaming server provides a manifest file that describes each of the chunks that comprise the event. For example, a one-minute video provided by smooth streaming may include 60 one-second audiovisual chunks. Each chunk contains metadata and media content. The metadata may describe useful information about the media content, such as the bit rate of the media content, where the media content fits into a larger media element, a codec used to encode the media content, and so forth. The client uses this information to place the chunk into a storyboard of the larger media element and to properly decode and playback the media content. The chunks can be in any format, such as Motion Picture Experts Group (MPEG) 4 boxes or other containers. A smooth streaming client plays a media event to a user by reading the manifest and regularly requesting chunks from the server. The user may also skip around (e.g., seek, fast forward, rewind) and the client can provide these behaviors by requesting later or earlier chunks described by the manifest. For live events, the server may provide the manifest to the client piecemeal, so that the server informs the client of newly available chunks as they become available.

Each chunk may have its own Uniform Resource Locator (URL), allowing chunks to be cacheable by existing Internet infrastructure. The Internet contains many types of downloadable media content items, including audio, video, documents, and so forth. These content items are often very large, such as video in the hundreds of megabytes. Users often retrieve documents over the Internet using Hypertext Transfer Protocol (HTTP) through a web browser. The Internet has built up a large infrastructure of routers and proxies that are effective at caching data for HTTP. Servers can provide cached data to clients with less delay and by using fewer resources than re-requesting the content from the original source. For example, a user in New York may download a content item served from a host in Japan, and receive the content item through a router in California. If a user in New Jersey requests the same file, the router in California may be able to provide the content item without again requesting the data from the host in Japan. This reduces the network traffic over possibly strained routes, and allows the user in New Jersey to receive the content item with less latency.

While smooth streaming provides a great experience for viewing streaming media over the Internet and other networks, its implementation involves a significant amount of client-side work. For example, the client has to understand manifests, be able to dynamically build manifests for live events (where portions of the manifest are received over time), understand chunk unboxing and assembly for decoding by a codec, synchronizing multiple streams (such as audio and video data), and so forth. In addition, using smooth streaming involves tracking heuristics and adaptive responsiveness (e.g., to the rate of making chunk requests) on the client. The heuristics are complicated and needed for adaptive streaming to work properly and provide a great user experience. Client development is complex and each developer that wants to play smooth streaming content has to deal with intricate platform specific details and then write a smooth streaming client.

SUMMARY

A streaming abstraction system is described herein that provides application developers a consistent client software development kit (SDK) (called the IIS Smooth Streaming Client) on top of which to build smooth streaming solutions. The system reduces development time considerably and abstracts platform specific intricacies and protocol handling on the client. In addition, the streaming abstraction system makes it possible to monetize streaming content with advanced features like advertising and analytics and provides advanced capabilities like multiple camera angles, diagnostics, and error handling. In some embodiments, the streaming abstraction system provides an intermediate layer that operates between an application and an underlying client media platform. The intermediate layer manages smooth streaming protocol handling as well as interactions with the platform-specific runtime. The system provides the developer with an interface, such as a SmoothStreamingMediaElement (SSME) class provided by the IIS Smooth Streaming Client, through which the application can access all of the power of the intermediate layer. The interface allows developers to present typical operations like play, pause, skip, and so forth in a user interface as well as more complex operations like scheduling an advertisement in between video segments, choosing a track for video, setting up closed captions, and so forth. Thus, the streaming abstraction system frees the developer to add features to the application while the system manages common interactions with the smooth streaming server and the client platform runtime component.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A streaming abstraction system is described herein that provides application developers with a consistent client software development kit (SDK) on top of which to build smooth streaming solutions. The system reduces development time considerably and abstracts platform specific intricacies and protocol handling on the client. In addition, the streaming abstraction system makes it possible to monetize streaming content with advanced features like advertising and analytics and provides advanced capabilities like multiple camera angles, diagnostics, and error handling. In some embodiments, the streaming abstraction system provides an intermediate layer that operates between an application and an underlying client media platform. For example, the system can use MICROSOFT™ SILVERLIGHT™ as an underlying media platform and provide easy smooth streaming playback to the application. In other embodiments, the system may use other media playback runtimes.

An intermediate layer provided by the system manages smooth streaming protocol handling as well as interactions with the platform-specific runtime. The system provides the developer with an interface, such as a SmoothStreamingMediaElement (SSME) through which the application can access all of the power of the intermediate layer. The interface allows developers to expose typical operations like play, pause, skip, and so forth as well as more complex operations like scheduling an advertisement in between video segments, choosing a track for video, setting up closed captions, and so forth. Thus, the streaming abstraction system frees the developer to add features to the application while the system manages common interactions with the smooth streaming server and the client platform runtime.

In some embodiments, the streaming abstraction system is built using a layered architecture. The basic components of this architecture are a smooth streaming core, the SSME interface exposed to applications, and the smooth streaming client application. The smooth streaming client application includes the final user interface exposed to users, end user functionality such as controls for interacting with content or altering playback, and so forth. The SSME interface provides a consistent, familiar interface for smooth streaming application development. In some embodiments, the SSME interface signature closely mirrors that of a MediaElement interface provided by the underlying platform for playing conventional (e.g., not smooth streaming) multimedia content, such as local or downloaded video files, although the system can also operate with a different interface and may diverge from the MediaElement interface in the future. The smooth streaming core includes a smooth streaming source component that interacts with the underlying platform runtime for the actual streaming. This and other components may be inaccessible to developers (e.g., through private or hidden interfaces) but may be part of the same module or software component in which the streaming abstraction system is implemented.

The core may also include a diagnostics component that collects tracing and diagnostics information for the system. For example, application developers may want to determine average bitrate and other statistics useful for application tuning or for display to application users. In some embodiments, the smooth streaming core includes an extension component that provides an architecture for adding vertical extensions built on top of the SSME interface. An extension layer allows developers/platform teams to build extensions that can be then used as needed as a part of applications. The core includes those functions that are broadly used while the extension layer provides functions for more specialized purposes, such as playlists, rough-cut editing, and so forth. Extensions add additional functionality using hooks in the SSME.

Figure 1:
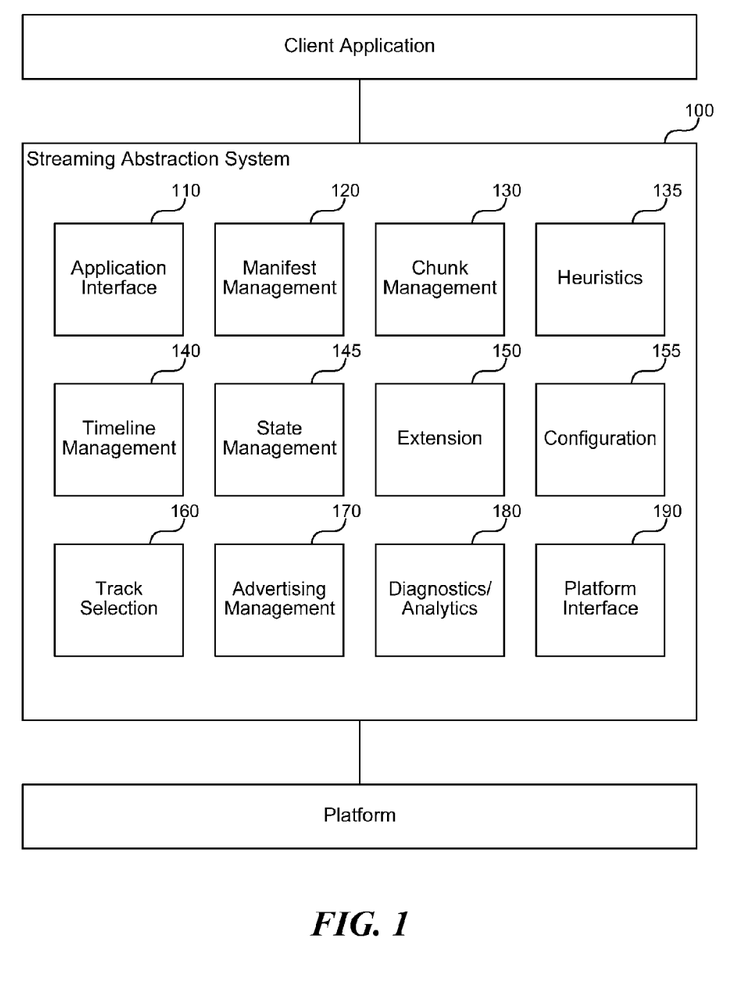
FIG. 1 is a block diagram that illustrates components of the streaming abstraction system, in one embodiment.

FIG. 1 is a block diagram that illustrates components of the streaming abstraction system, in one embodiment. The system 100 includes an application interface component 110, a manifest management component 120, a chunk management component 130, a heuristics component 135, a timeline management component 140, a state management component 145, an extension component 150, a configuration component 155, a track selection component 160, an advertising management component 170, a diagnostics/analytics component, and a platform interface component 190. Each of these components is described in further detail herein.

The application interface component 110 provides an interface to client applications through which the applications can access smooth streaming media. For example, the SSME interface described herein provides one application interface through which applications can select tracks, play smooth streaming media, control playback (e.g., pause, skip), insert advertisements, and so forth. The application interface component 110 may provide a variety of functions that can be called by applications using a variety of programming languages and platforms. For example, the SSME interface in one embodiment uses MICROSOFT™ .NET and can interact with .NET languages (e.g., C#, VB.NET, and so on).

The manifest management component 120 downloads manifest information from a smooth streaming server that describes smooth streaming media to be played by the system 100. A manifest may include an extensible markup language (XML) file or other format that describes one or more available tracks, quality levels available (e.g., based on video bitrate or audio encoding format), and chunks that make up the content. Each chunk may include an HTTP cacheable portion of the media, retrievable at a specified URL. The chunk may include a frame, MPEG Group of Pictures (GOP), particular number of seconds, or other appropriate subdivision of content for transmission in parts from a server to a client. In some embodiments, the manifest management component 120 handles manifest updates for live events during which a smooth streaming server provides updates as the event progresses so that the client can build a manifest and find out about new chunks that are available.

The chunk management component 130 retrieves one or more chunks associated with smooth streaming media, and prepares the chunks for playback by an underlying platform. For example, the chunk management component 130 may identify chunks in the manifest and periodically issue requests to retrieve new chunks from a server. Upon receipt of each chunk, the component 130 places the chunks in a playback queue. The component 130 may also unbox the received chunks to extract metadata and content as well as providing any decoding to place the content in a format that the underlying platform can playback. In some cases, the underlying platform may provide one or more codecs associated with the content so that the chunk management component 130 extracts the content from an on the wire format and provides it to the platform layer for decoding and playback.

The heuristics component 135 analyzes the success of receiving packets from the server and adapts the client's requests based on a set of current network and other conditions. For example, if the client is routinely receiving media chunks late, then the component 135 may determine that the bandwidth between the client and the server is inadequate for the current bit rate, and the client may begin requesting media chunks at a lower bit rate. Monitoring may include measurement of other heuristics, such as render frame rate, window size, buffer size, frequency of rebuffering, and so forth. Media chunks for each bit rate may have a distinguished URL so that chunks for various bit rates are cached by Internet cache infrastructure. Note that the server does not track client state and does not know what bit rate any particular client is currently playing. The server can simply provide the same media element in a variety of bit rates to satisfy potential client requests under a range of conditions. In addition, the initial manifest and/or metadata that the client receives may include information about the bit rates and other encoding properties available from the server, so that the client can choose the encoding that will provide a good client experience.

The timeline management component 140 determines a timeline that represents a duration of the smooth streaming media and allows the client application to make requests that use the timeline as a reference point. For example, the client application may display a playback bar to the user that shows a notch that advances as the streaming media is played from beginning to end. To do this, the system 100 informs the client application (or makes available through the application interface component 110) an expected timeline. For live events where the full duration of the event is not yet known, the component 140 may add to the timeline over time or provide an estimated completion for the event. The client application may allow the user to click the playback bar to select a particular location (e.g., seeking) within the streaming presentation, and upon receiving such a selection the application may invoke the application interface component 110 and provide a time for seeking relative to the timeline established by the timeline management component 140.

The state management component 145 manages state information about ongoing playback and provides client applications with consistent state indications. The component 145 allows state management within the SSME and provides developers an easy way to track the state of the playback without having to understand potentially changing conditions. The state management component 145 may also allow client applications to set and receive notification of markers and other state related points within a presentation.

In some embodiments, the manifest management component 120, chunk management component 130, heuristics component 135, timeline management component 140, and state management component 145 comprise a smooth streaming core layer in a layered architecture of the streaming abstraction system 100. The smooth streaming core may not be directly available to applications, but may be exposed through the application interface component 110, so that applications can request information from the core and invoke particular operations using the core.

The extension component 150 provides a uniform interface through which the system 100 can be extended by developers. For example, developers may want to provide extensions to perform additional actions not natively provided by the smooth streaming core. For example, a developer of an advertisement-tracking site that provides analytics or advertising may provide an extension that allows client application developers that use the tracking site to update the tracking site about media playback. For example, the developer may have a contract with the tracking site that specifies that a particular advertisement will be shown, and upon showing the advertisement, the developer may inform the tracking site so that the developer can be paid. Rather than each developer writing code to update the tracking site, the tracking site or any of the developers can write an extension for use with the streaming abstraction system 100. The extension component 150 provides event notifications at relevant times during the operation of the system 100 and receives requests to retrieve information and perform whatever actions are relevant for the particular extension. In general, an extension can do anything that an application can do and may even receive an instance of the same SSME interface.

The configuration component 155 provides an interface through which developers can configure the system 100. For example, the component 155 may receive information about developer extensions.

The track selection component 160 allows a client application to select available streaming media tracks for playback. A streaming media presentation may provide tracks having multiple types of content (e.g., video, audio, text) and may also provide multiple tracks related to similar content (e.g., different camera angles of video of the same event). The track selection component 160 provides a list of tracks to a client application and receives one or more track selections from the application through the application interface component 110.

The advertising management component 170 allows a client application to insert advertisements into a streaming media presentation. In smooth streaming, advertisements may be inserted by the server or the client. Client application developers may have contractual or other obligations to display advertisements at particular locations within a streaming media presentation or after specified intervals. The advertising management component provides, through the application interface component 110, functions for uniformly inserting advertisements so that applications do not have to manage the low-level aspects of displaying an advertisement and pausing any on-going presentation.

The diagnostics/analytics component 180 provides a facility for diagnosing errors and receiving reports related to playback of smooth streaming media. The component 180 may provide statistics, such as an average bitrate of video playback, the amount of time content has been played, and so forth, as well as diagnostic information, such as which servers provided requested media, a particular selected media source, advertisements displayed, and so forth.

The platform interface component 190 provides an interface to an underlying platform for playing media content. The streaming abstraction system 100 operates as an intermediate layer for abstracting common functionality between a client application that uses smooth streaming media and a platform for playing back media. The platform may include an operating system, computer hardware, a runtime component, an application sandbox, and other available underlying functionality. The platform interface component 190 accesses available platform functionality to playback media using client hardware, store media information, log statistics, and so forth. In some embodiments, the system 100 uses the MICROSOFT™ SILVERLIGHT™ platform, which can operate within a web browser or as a standalone application to playback media.

The computing device on which the streaming abstraction system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, systems on a chip (SOCs), set top boxes, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
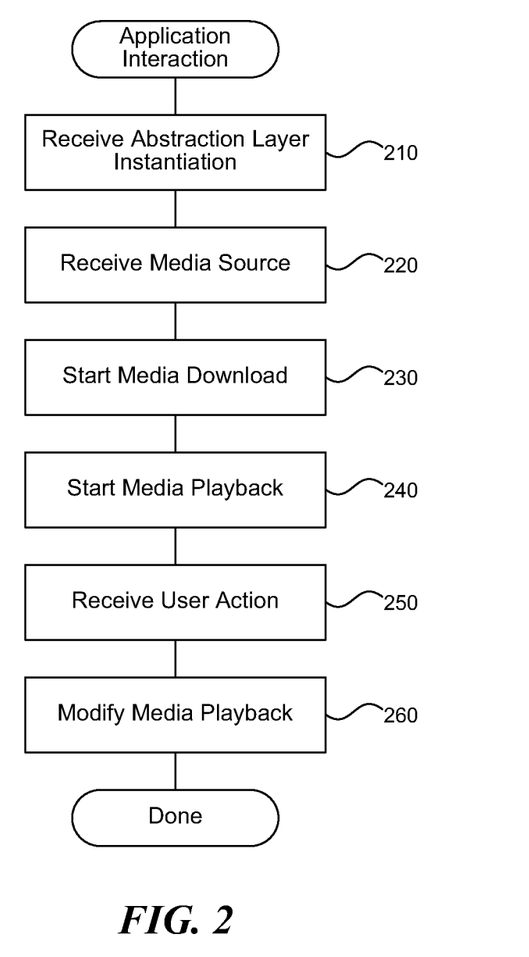
FIG. 2 is a flow diagram that illustrates processing of the streaming abstraction system to interact with an application to perform a sample action, in one embodiment.

FIG. 2 is a flow diagram that illustrates processing of the streaming abstraction system to interact with an application to perform a sample action, in one embodiment. Beginning in block 210, the system receives a request to instantiate an abstraction layer. For example, a web developer may include an instance of the SSME interface described herein in a web page requested by a client browser. The system instantiates the abstraction layer and waits for application requests to perform actions using the abstraction layer. Continuing in block 220, the system receives a request to set a media source through the abstraction layer. For example, a client application may call an API that sets the source to a smooth streaming server URL. The URL may identify a particular manifest (e.g., an ISM file) that describes a particular smooth streaming content item. Upon receiving the request, the system may send a request to the server on behalf of the application to download the manifest and other information for consuming the smooth streaming media.

Continuing in block 230, the system starts downloading media associated with the media source on behalf of the application. The system performs media setup and retrieval on behalf of the application without the application having to write any specific programming code other than invoking the system with the location of the streaming media. The system may perform other actions on behalf of the application, such as selecting an initial bitrate or encoding to download, determining a window size for displaying the selected media, and informing the application of the size, for example. Continuing in block 240, the system starts playing back the downloaded media on behalf of the application. The application does not need any particular codec support or need to have any understanding of smooth streaming protocols. In some embodiments, the SSME interface through which the application interacts with the system mirrors and adds more capabilities over the MediaElement interface provided natively by the SILVERLIGHT™ platform, so that the application can interact with smooth streaming media as easily as local media types.

Continuing in block 250, the system receives an indication that a user action related to the media playback has occurred. For example, the user may attempt to skip to a new location on a media playback timeline, fast forward the media, pause the media, and so forth. The application displays its own controls and user interface, and upon receiving user input passes that input to the abstraction layer for handling. Continuing in block 260, the system modifies the media playback in accordance with the received indication of the user's action. For example, if the user requested to display a higher quality version of the media content, then the system may switch to a higher bitrate stream, download chunks related to the higher bit rate, resize the client side display to accommodate a larger media display area, and begin playing back the higher bitrate stream for display to the user. After block 260, these steps conclude.

Figure 3:
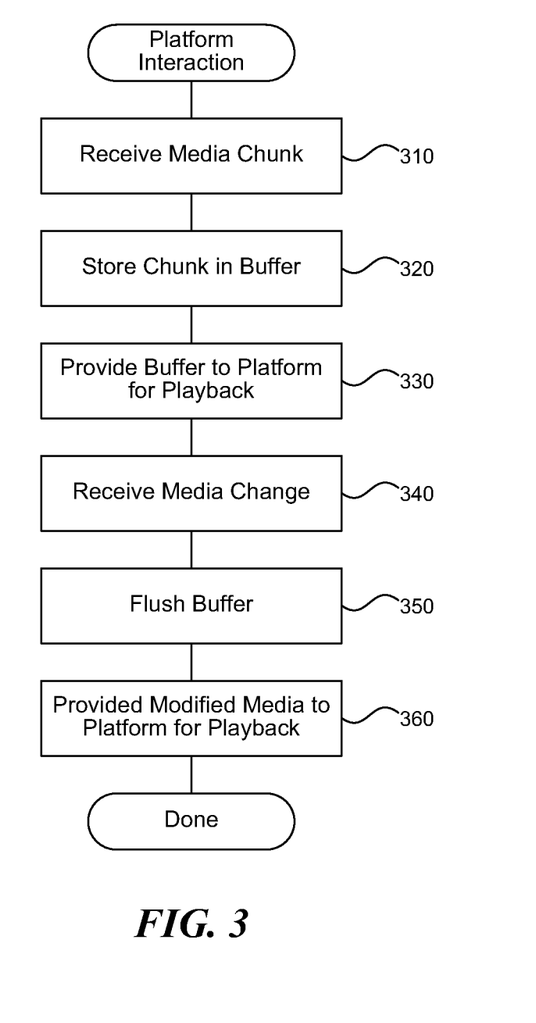
FIG. 3 is a flow diagram that illustrates processing of the streaming abstraction system to interact with an underlying platform to perform one or more actions, in one embodiment.

FIG. 3 is a flow diagram that illustrates processing of the streaming abstraction system to interact with an underlying platform to perform one or more actions, in one embodiment. Beginning in block 310, the system receives a media chunk from a smooth streaming server. For example, the system may regularly request chunks in response to a client application request to playback smooth streaming media from an identified source (e.g., via a URL). The media chunk may include a GOP, frame, or other portion of an encoded media stream. Continuing in block 320, the system stores the received media chunk in a buffer for playback. The chunk and other received chunks may include multiple streams and stream types, such as video of multiple camera angles, related audio streams, text streams with captions or other information, and so forth. The system may receive chunks at a cadence that allows the system to stay several seconds ahead of a current playback point, while still presenting media to the user with low latency (e.g., for live events). The buffer allows the client to store frames that are ready for playback but not yet due to be played.

Continuing in block 330, the system provides the buffer to a platform layer that includes audiovisual decoding and playback facilities. For example, the MICROSOFT™ SILVERLIGHT™ platform and other platforms provide codecs that can decode audiovisual data and has access to hardware, such as speakers, that can playback audiovisual data. The streaming abstraction system frees the client application from low-level management of media data, and lets the application developer focus on adding application features, such as advanced user controls and branding information. Continuing in block 340, the system receives a media change indication. For example, the client may determine that the user has resized a video window or that the connection between the client and the server has bandwidth too low to support a current bitrate. The system may change the bitrate based on the new window size or available bandwidth and begin downloading media chunks related to the new bitrate from one or more servers.

Continuing in block 350, the system flushes the buffer to provide modified media with less delay. The system could wait for the existing buffer to be exhausted, but based on an application request or internal determination may instead flush the buffer and start playing the newly received chunks more quickly so that the user sees the change in close proximity to the event that led to the change (e.g., the user resizing the window). Continuing in block 360, the system provides modified media chunks to the platform layer for playback. The system interacts with the platform layer on behalf of a client application to respond to these and other types of changes so that the application can focus on application-level features. Common, low-level implementation for getting a smooth streaming client up and running quickly are handled by the streaming abstraction system on behalf of the application. After block 360, these steps conclude.

Figure 4:
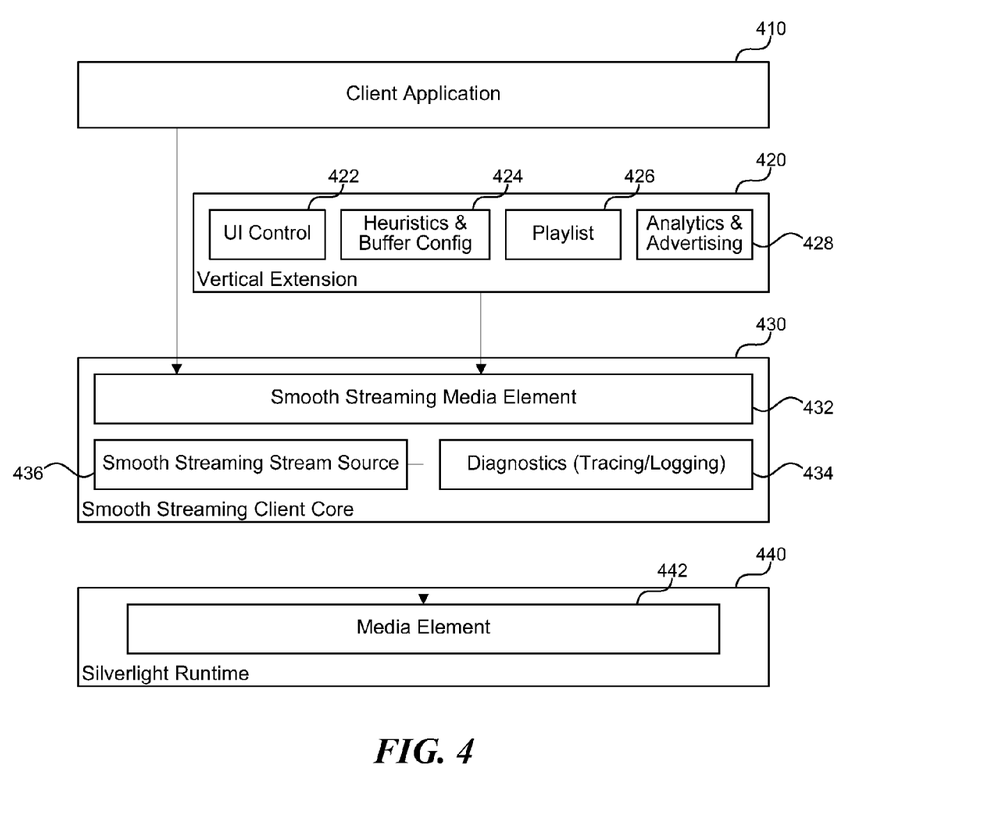
FIG. 4 is a block diagram that illustrates a layered architecture in accordance with the streaming abstraction system, in one embodiment.

FIG. 4 is a block diagram that illustrates a layered architecture in accordance with the streaming abstraction system, in one embodiment. A client application 410 that wants to use smooth streaming multimedia invokes a smooth streaming core 430 that implements the system described herein. The core 430 may perform various internal functions to save the application 410 developer from having to understand and re-implement client concepts related to smooth streaming.

The core 430 exposes an application-facing smooth streaming media element interface 432 through which the application can receive media information and manage media operations. The core 430 may also include internal interfaces for managing smooth streaming sources 436, for capturing diagnostic information 434, and so forth. The core 430 communicates with a platform, such as the SILVERLIGHT™ Runtime 440 shown. MICROSOFT™ SILVERLIGHT™ provides a media element interface 442 suitable for decoding and playing back media once the smooth streaming core 430 places the media in a recognized format for the platform. The system may also include an extension layer 420 through which developers can provide extensions to applications for various tasks. For example, extensions can provide common user interface controls 422, configuration options, heuristics and buffer configuration options 424, playlists 426 (such as for stitching multiple media presentations together), analytics/advertising 428, and any other extensions that developers devise.

Although some components are illustrated in FIG. 4, those of ordinary skill in the art will recognize that the system may contain other components not shown that make IIS Smooth Streaming work but are abstracted from the developer. In the interest of straightforward presentation of the developer SDK layer, these items are not shown in FIG. 4.

The following table illustrates some of the functions provided by the SSME interface to abstract management of smooth streaming content from applications, in some embodiments. Methods inherited from parent classes are omitted (e.g., UIElement, FrameworkElement, Control, DependencyObject, and so forth). Those of ordinary skill in the art will recognize that other interface specifications can be used to provide similar results and may present various positive or negative design trade-offs while providing similar functionality and operation.

Methods

The following are methods that the application can call to manipulate smooth streaming media presentations.

| Name | Description |
| --- | --- |
| CreateClipMediaElement | Virtual method for derived methods that create a media element. |
| FlushBuffers | Flushes audio and/or video buffers, retaining a specified amount of content if possible. May be used when switching display area size. |
| GetStreamInfoForStreamType | Gets the available streams for a stream type specified by the parameter. Presentations may include text, video, audio, and other streams. Each stream may include multiple tracks (e.g., resolutions or bitrates). |
| MergeExternalManifest | Replaces some elements of the main manifest with others from an external manifest or adds new elements to the main manifest. For example, where a website syndicates another site's content and each has a different advertising policy, one site may substitute its own ads for another's. |
| OnApplyTemplate | Disconnects and connects event handlers and key properties during a template change. (Overrides FrameworkElement.OnApplyTemplate( ).) |
| OnClipClickThrough | Handles a mouse-click event on the advertising surface. |
| OnClipError | Handles an error event that occurs while playing a media clip. |
| OnClipMouseLeftButtonUp | Handles the mouse left button up event on the advertising surface. |
| OnClipProgressUpdate | Handles a progress event that occurs while playing a media clip. |
| OnClipStateChanged | Handles a state change event on a media element. |
| OnMarkerReached | Handles an event when a marker is reached while playing audio or video media. |
| OnSmoothStreamingErrorOccurredEvent | Handles the event when an error occurs while playing audio or video media. |
| OnSmoothStreamingSourceChanged | Handles an event when the source property is changed on the media element. |
| ParseExternalManifest | Downloads, parses, and returns an object representing an external manifest specified by externalManifestUri. |
| Pause | Pauses play of audio or video media. |
| Play | Starts audio or video media play. This may operate on a collection of multiple streams/tracks. |
| RequestLog | Sends a request to generate a log that will be raised by the LogReady event. This can be used for diagnostics. |
| ScheduleClip(ClipInformation, Boolean, Object) | Schedules play of a media clip. The method inserts a clip that will play for its duration and then the stream that was interrupted will resume. |
| ScheduleClip(ClipInformation, ClipContext, Boolean, Object) | Schedules play of a media clip. The method inserts a clip that will play for its duration and then the stream that was interrupted will resume. For example, can be used to insert advertisements. |
| ScheduleClip(ClipInformation, TimeSpan, Boolean, Object) | Schedules play of a media clip. The method inserts a clip that will play for its duration and then the stream that was interrupted will resume. |

-continued

| Name | Description |
| --- | --- |
| SelectTracksForStream | Sets tracks that will be available for download for a particular stream. |
| SetBitrateRange | Sets the range of allowable bitrates for download of mediaStreamType. |
| SetPlaybackRate | Sets the playback rate of media stream. Allows for simulated fast forward, rewind. |
| SetSource | Sets the source of SmoothStreamingMediaElement object. |
| StartSeekToLive | Starts seek to live media stream. Catches up to a current live event. |
| Stop | Stops play by the SmoothStreamingMediaElement object. |
| UpdateVisualState | Updates the current visual state of the control. |

Properties

The following are properties that the application can retrieve and in some cases set to determine information about smooth streaming media presentations and modify behavior of the system.

| | |
| --- | --- |
| Attributes | Gets or sets the Attributes. |
| AudioStreamCount | Gets or sets the AudioStreamCount property. |
| AudioStreamIndex | Gets or sets the AudioStreamIndex property. |
| AutoPlay | Gets or sets the AutoPlay property. |
| AvailableStreams | Gets the AvailableStreams property. |
| Balance | Gets or sets the Balance property. |
| BufferingProgress | Gets or set the BufferingProgress property. |
| BufferingTime | Gets or sets the BufferingTime property. |
| CanPause | Gets or sets the CanPause property. |
| CanSeek | Gets or sets the CanSeek property. |
| ClipMediaElementStyle | Gets or sets the ClipMediaElementStyle property. |
| ClipPosition | Gets or sets the ClipPosition property. Can be used to inspect a timeline associated with a multi-clip stream. |
| ClipPreloadTime | Gets or sets the ClipPreloadTime property. |
| ConfigPath | Gets or sets the ConfigPath property. |
| CookieContainer | Gets or sets the CookieContainer property. |
| CurrentState | Gets or sets the CurrentState property. Can show platform states or states related to the clip playing. |
| DownloadProgress | Gets or sets the DownloadProgress property. |
| DownloadProgressOffset | Gets or sets the DownloadProgressOffset property. |
| DroppedFramesPerSecond | Gets or sets the DroppedFramesPerSecond property. |
| Duration | Gets or sets the Duration property. |
| EnableGPUAcceleration | Gets or sets the EnableGPUAcceleration property. Affects scaling. |
| EndPosition | Gets or sets the EndPosition property. |
| IsLive | Gets the IsLive property. Identifies whether content is live or on-demand. |
| IsLivePosition | Gets or sets the IsLivePosition property. |
| IsMuted | Gets or sets the IsMuted property. |
| LicenseAcquirer | Gets or sets the LicenseAcquirer property. |
| LiveBufferSize | Gets the LiveBufferSize property. |
| LivePlaybackStartPosition | Gets or sets the LivePlaybackStartPositionproperty. |
| LivePosition | Gets the LivePosition property. |
| LoggingConfigPath | Gets or sets the LoggingConfigPath property. |
| LoggingUrl | Gets or sets the LoggingUrl property. URL used for analytics. |
| ManifestCustomAttributes | Gets or sets the ManifestCustomAttributes property. |
| ManifestDuration | Gets the ManifestDuration property. |
| Markers | Gets the Markers property. |
| Master | Gets or sets the Master property. Can be used along with Slave for playing multiple camera angles. Slave video clips may play audio from the master clip (to avoid overlapping audio). |
| NaturalDuration | Gets the NaturalDuration property. |
| NaturalVideoHeight | Gets the NaturalVideoHeight property. |
| NaturalVideoWidth | Gets the NaturalVideoWidth property. |
| PipMode | Gets or sets the PipMode property. |
| PlaybackRate | Gets the PlaybackRate property. |
| Position | Gets or sets the Position property. |
| RenderedFramesPerSecond | Gets the RenderedFramesPerSecond property. |
| Scrubbing | Gets or sets the Scrubbing property. |
| SelectedStreams | Gets or sets the SelectedStreams property. |

-continued

| | |
|---|---|
| SmoothStreamingSource | Gets or sets the SmoothStreamingSource property. Provides the main URL from which the system retrieves smooth streaming content and the manifest. |
| Source | Gets or sets the Source property. |
| StartPosition | Gets or sets the StartPosition property. |
| Stretch | Gets or sets the Stretch property. |
| SupportedPlaybackRates | Gets or sets the SupportedPlaybackRates object. |
| TotalBytesDownloaded | Gets the TotalBytesDownloaded property. |
| TrailingWindowDuration | Gets or sets the TrailingWindowDuration property. |
| VideoDownloadTrack | Gets the VideoDownloadTrack property. |
| VideoPlaybackTrack | Gets the VideoPlaybackTrack property. Identifies the track being played. |
| Volume | Gets or sets the Volume property. |

Events

The following are events that the system fires to notify a client application about changes that are potentially relevant to the application. In many cases, the application calls methods of the system in response to the events fired by the system.

An application using the above interface can very easily insert smooth streaming content for display in a web page. The following Extensible Application Markup Language (XAML) shows a simple tag for including smooth streaming media in a web application in an embodiment that uses SILVERLIGHT™ as the runtime layer:

| | |
|---|---|
| BufferingProgressChanged | Event that occurs when the BufferingProgress property changes. |
| ClipClickThrough | Event that occurs when a user clicks the media display. For example, can direct a user to a product when clicking on an advertisement. |
| ClipError | Event when an error occurs during play of audio or video media. |
| ClipProgressUpdate | Event that occurs when media hits a marker. Provides quartiles according to Internet Advertising Bureau standards. |
| ClipStateChanged | Event that occurs when a media clip state changes. |
| CurrentStateChanged | Event that occurs when the current state of media element changes. |
| DownloadProgressChanged | Event that occurs when the DownloadProgress property changes. |
| DownloadTrackChanged | Event that occurs when the track selected for download differs from the previously selected track. |
| DurationExtended | Event that occurs when the Duration property changes. |
| LiveEventCompleted | Event that occurs when a live media stream ends. |
| LogReady | Event that occurs when the log generated by the RequestLog method is ready. |
| ManifestMerge | Event that occurs when the main manifest has been parsed. Provides the option to merge external manifests with the main manifest. |
| ManifestReady | Event that occurs when the manifest for the Smooth Streaming content is available for track selection. Fired when an asset is loaded and read to play. |
| MarkerReached | Event that occurs when media playback hits a timeline marker. |
| MediaEnded | Event that occurs when media playback reaches the end. |
| MediaFailed | Event that occurs when there is an error associated with the media source. |
| MediaOpened | Event that occurs when the media stream has been validated and opened and the file headers have been read. |
| PlaybackTrackChanged | Event that occurs when the currently playing track changes. |
| SeekCompleted | Event that occurs when a seek operation completes. Provides an opportunity to repaint the user interface. |
| SmoothStreamingErrorOccurred | Event invoked when an error occurs during playback of Smooth Streaming content. |
| TimelineEventReached | Event that occurs when a timeline event is reached during playback. |

```
<SSME:SmoothStreamingMediaElement AutoPlay="True" x:Name=
"SmoothPlayer" SmoothStreamingSource="http://microsoft.com/
presentation.ism /Manifest" Grid.Row="0" />
```

This line defines a new SSME interface, indicates a smooth streaming source (through the SmoothStreamingSource property), and specifies that the presentation begin playing as soon as it is available (through the AutoPlay property).

In some embodiments, the streaming abstraction system provides multiple audio stream selection through the SSME interface. For example, in addition to the interface specification described herein, the SSME interface may include a SelectStreams API for selecting audio streams from multiple available audio streams. For example, a content producer may provide audio in several languages, using particular techniques like surround sound, and so forth.

In some embodiments, the streaming abstraction system provides one or more APIs for requesting optional content, such as captions. The system may include events or properties that identify whether optional content is available, methods for retrieving the optional content, and an auto update property that causes the system to automatically keep getting optional content until the property is unset.

In some embodiments, the streaming abstraction system provides one or more APIs for retrieving content for offline display. For example, a cache plugin/extension may allow a user that is going to be getting on an airplane to instruct the system to download a particular smooth streaming media presentation and cache the manifest and media chunks on a laptop or other computer system.

In some embodiments, the streaming abstraction system allows an application to be stateless. The interface described herein allows an application to receive a pool of markers without having to manage multiple sets of markers. The application also can be assured that certain events will happen in a defined order (e.g., receiving deselect before select events) by definition of the interface contract of the SSME or other interface. These properties allow the application to be stateless and react to events as they are received. If a clip changes, the application can react and redraw a playback timeline or other controls. If the screen size changes, the application can request a different bitrate and flush existing buffers. After setting up a particular presentation to play, the application can rely on the system to provide notifications at appropriate decision points so that the application developer can implement particular behavior without tracking detailed information about the media state.

From the foregoing, it will be appreciated that specific embodiments of the streaming abstraction system have been described herein for purposes of illustration, but that various modifications may be made without deviating from the spirit and scope of the invention. Accordingly, the invention is not limited except as by the appended claims.

We claim:

1. A computer-implemented method for interaction with an application from a client abstraction layer, the method comprising:

receiving a request to instantiate the client abstraction layer;

receiving a request to set a media source through the abstraction layer, wherein the media source identifies a server from which the abstraction layer can retrieve an identified media presentation;

downloading media associated with the requested media source on behalf of the application;

starting playback of the downloaded media on behalf of the application;

receiving an indication that a user action related to the media playback has occurred; and modifying the media playback in accordance with the received indication of the user's action, wherein the preceding steps are performed by at least one processor.

2. The method of claim 1 wherein receiving the request to instantiate the client abstraction layer comprises identifying an instance of an object provided by the layer in a web page requested by a client browser.

3. The method of claim 1 wherein receiving the request to set the media source comprises receiving the media source in the request to instantiate the client abstraction layer.

4. The method of claim 1 wherein receiving the request to set the media source comprises receiving the media source from a client application call to a software method provided by the abstraction layer.

5. The method of claim 1 wherein receiving the request to set the media source comprises receiving a path to a manifest used for smooth streaming media.

6. The method of claim 1 further comprising, upon receiving the request to set the media source, sending from the abstraction layer a request to an identified server on behalf of the application to download a smooth streaming manifest for consuming the identified media presentation.

7. The method of claim 1 wherein starting download media comprises performing media setup and retrieval on behalf of the application without the application having to write specific programming code other than invoking the system with the location of the streaming media.

8. The method of claim 1 wherein starting playback of the downloaded media on behalf of the application comprises abstracting knowledge of particular codecs and smooth streaming protocols from the application.

9. The method of claim 1 wherein the abstraction layer provides application programming interfaces to the application for manipulating media to play, pause, and seek within the media presentation.

10. The method of claim 1 wherein receiving the indication of the user action comprises receiving an indication that the user requested to skip to a new location within the media presentation.

11. The method of claim 1 wherein modifying the media playback comprises performing one or more smooth streaming actions within the abstraction layer without input from the application.

* * * * *